US010097489B2

(12) United States Patent
Lin

(10) Patent No.: US 10,097,489 B2
(45) Date of Patent: Oct. 9, 2018

(54) SECURE E-MAIL ATTACHMENT ROUTING AND DELIVERY

(71) Applicant: Wei Lin, ShangHai (CN)

(72) Inventor: Wei Lin, ShangHai (CN)

(73) Assignee: SAP SE, Walldorf (DE)

(*) Notice: Subject to any disclaimer, the term of this patent is extended or adjusted under 35 U.S.C. 154(b) by 334 days.

(21) Appl. No.: 14/608,701

(22) Filed: Jan. 29, 2015

(65) Prior Publication Data
US 2016/0226808 A1 Aug. 4, 2016

(51) Int. Cl.
H04L 12/58 (2006.01)

(52) U.S. Cl.
CPC .............. *H04L 51/12* (2013.01); *H04L 51/08* (2013.01); *H04L 51/14* (2013.01)

(58) Field of Classification Search
CPC ......... H04L 51/08; H04L 51/12; H04L 51/14; G06Q 10/107
USPC ........................................................ 709/206
See application file for complete search history.

(56) References Cited

U.S. PATENT DOCUMENTS

| 6,970,908 | B1* | 11/2005 | Larky .................... H04L 51/00 |
| | | | 707/999.006 |
| 7,409,425 | B2 | 8/2008 | Naick et al. |
| 7,500,004 | B1* | 3/2009 | Homer .................... H04L 67/06 |
| | | | 707/999.006 |
| 7,519,817 | B2 | 4/2009 | Meier et al. |
| 7,590,640 | B2 | 9/2009 | Wolber et al. |
| 7,802,175 | B2 | 9/2010 | Wagner et al. |
| 7,836,134 | B2 | 11/2010 | Pantalone |
| 8,478,832 | B2 | 7/2013 | Hirota et al. |
| 8,516,064 | B2 | 8/2013 | Steele |
| 8,606,867 | B2 | 12/2013 | Deshpande et al. |
| 8,806,190 | B1* | 8/2014 | Munshi ............... H04L 63/0428 |
| | | | 713/153 |
| 8,874,658 | B1* | 10/2014 | Khalsa .................... H04L 51/12 |
| | | | 709/206 |
| 9,135,458 | B1* | 9/2015 | Hankins, Jr. ............ H04L 63/04 |
| 9,503,280 | B2* | 11/2016 | Jhingan ................ G06Q 10/107 |

(Continued)

FOREIGN PATENT DOCUMENTS

JP 2011166467 A * 8/2011 ............. H04L 12/58

OTHER PUBLICATIONS

Nakatsuka_JP 2011166467 A _Pub Aug. 25, 2011 (Japanese patent application).*

(Continued)

*Primary Examiner* — Krista Zele
*Assistant Examiner* — Michael A Chambers
(74) *Attorney, Agent, or Firm* — Mintz Levin Cohn Ferris Glovsky and Popeo, P.C.

(57) ABSTRACT

An e-mail message is received that specifies at least one recipient and which includes an attachment. The attachment is a file having a header specifying at least one e-mail address for a permitted recipient. The header is analyzed to determine whether the at least one recipient is specified as a permitted recipient. The e-mail message is relayed to the at least one recipient if is determined that the at least one recipient is a permitted recipient. In addition or in the alternative, delivery of the e-mail message to the at least one recipient is prevented if is determined that the at least one recipient is not a permitted recipient. Related apparatus, systems, techniques and articles are also described.

12 Claims, 4 Drawing Sheets

(56) References Cited

U.S. PATENT DOCUMENTS

| | | | |
|---|---|---|---|
| 2003/0037116 A1* | 2/2003 | Nolan | G06Q 10/107 709/206 |
| 2003/0233419 A1 | 12/2003 | Beringer | |
| 2004/0162795 A1* | 8/2004 | Dougherty | G06F 17/30707 706/20 |
| 2005/0198180 A1 | 9/2005 | Khanolkar et al. | |
| 2006/0168036 A1 | 7/2006 | Schulz et al. | |
| 2007/0106736 A1 | 5/2007 | Shepherd | |
| 2009/0319623 A1* | 12/2009 | Srinivasan | G06Q 10/107 709/206 |
| 2010/0049978 A1* | 2/2010 | Ogawa | H04L 9/00 713/170 |
| 2010/0100815 A1 | 4/2010 | Hutchinson et al. | |
| 2010/0235452 A1 | 9/2010 | Fukasawa et al. | |
| 2011/0016191 A1* | 1/2011 | Tanaka | H04L 12/58 709/206 |
| 2011/0202621 A1* | 8/2011 | Laval | G06Q 10/107 709/206 |
| 2015/0188872 A1* | 7/2015 | White | H04L 51/28 709/206 |

OTHER PUBLICATIONS

Nakatsuka—JP 2011166467 A Aug. 25, 2011 JA (translated to English).*

* cited by examiner

# SECURE E-MAIL ATTACHMENT ROUTING AND DELIVERY

TECHNICAL FIELD

The subject matter described herein relates to an e-mail routing platform that ensures that e-mail messages with attachments are not inadvertently sent to unintended recipients.

BACKGROUND

There are many scenarios in which e-mail messages with attachments are inadvertently routed to unintended recipients. As one example, a manager creates a word processing document and marks it as confidential which indicates that this document should only be accessible to certain individuals within an organization. Later, the manager seeks to send the document to stakeholders A, B, and C; however, the manager inadvertently sends the document to stakeholders A, B, and unintended recipient D. In such case, recipient D will receive the document which can have negative consequences for the manager and/or the organization.

SUMMARY

In one aspect, an e-mail message is received that specifies at least one recipient and which includes an attachment. The attachment is a file having a header specifying at least one e-mail address for a permitted recipient. The header is analyzed to determine whether the at least one recipient is specified as a permitted recipient. The e-mail message is relayed to the at least one recipient if is determined that the at least one recipient is a permitted recipient. In addition or in the alternative, delivery of the e-mail message to the at least one recipient is prevented if is determined that the at least one recipient is not a permitted recipient.

The e-mail message can be received by a mail server from a client. The e-mail message can be received by a filter (i.e., an intermediate component, etc.) from a client and the relaying can include relaying the e-mail message to a mail server.

The e-mail message can be received by a client application on a client.

A file creation and editing program, such as a word processing application can be used to generate the attachment. In such cases, a graphical user interface can receive user-generated input specifying the at least one permitted recipient. For example, the at least one permitted recipient can be specified at file creation time, file modification time, or it can be separately modified.

The attachment can include an encrypted and/or compressed portion encapsulating content separate from the header.

There can be a plurality of recipients and, after a determination is made that only a subset of the recipients are permitted recipients, the e-mail message is relayed to only the subset of the recipients.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more hardware data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter ensures that e-mail attachments are only delivered to intended recipients thereby avoiding inadvertent disclosures of confidential or other sensitive information to The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
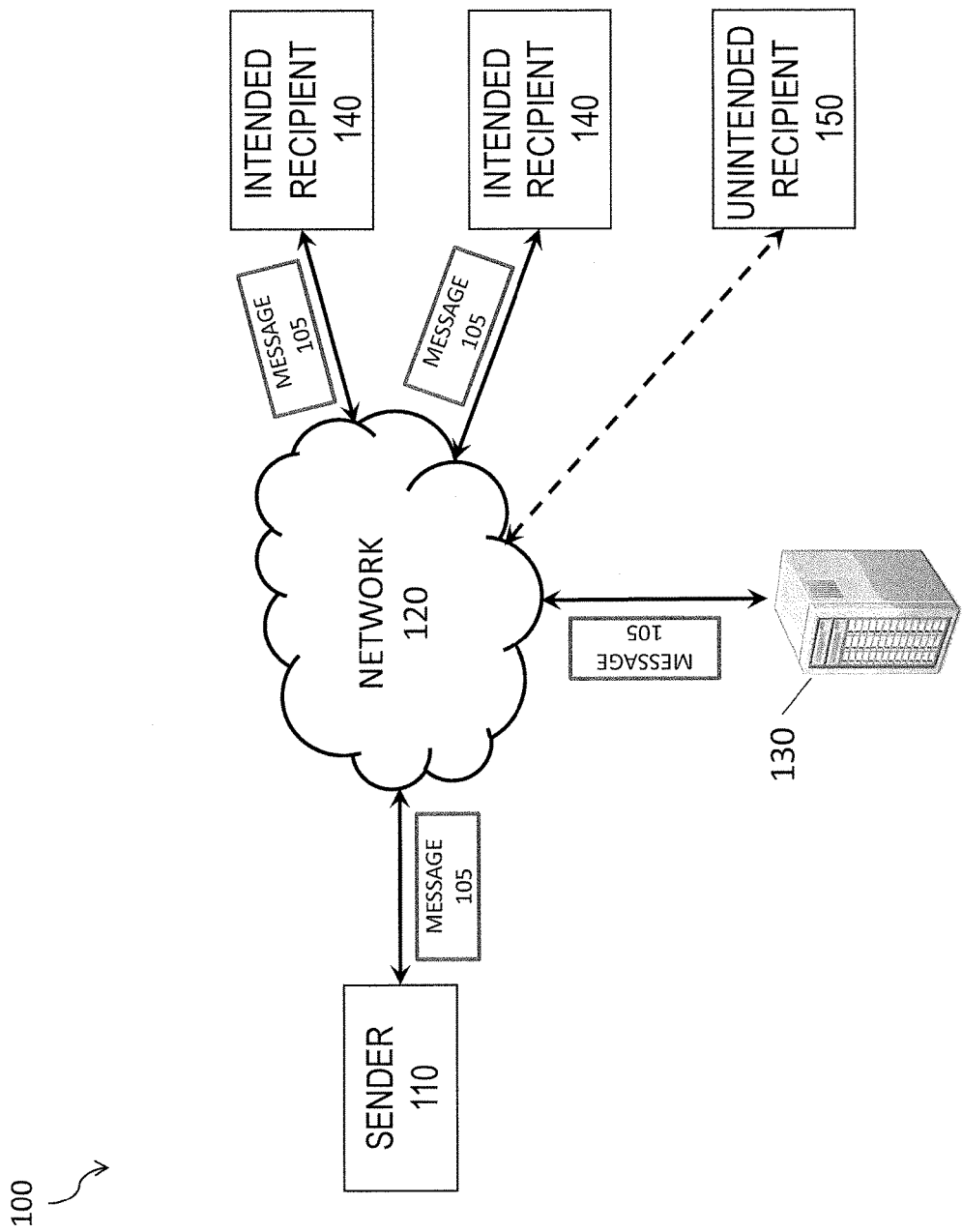
FIG. 1 is a system diagram illustrating a first e-mail attachment routing arrangement.
Figure 2:
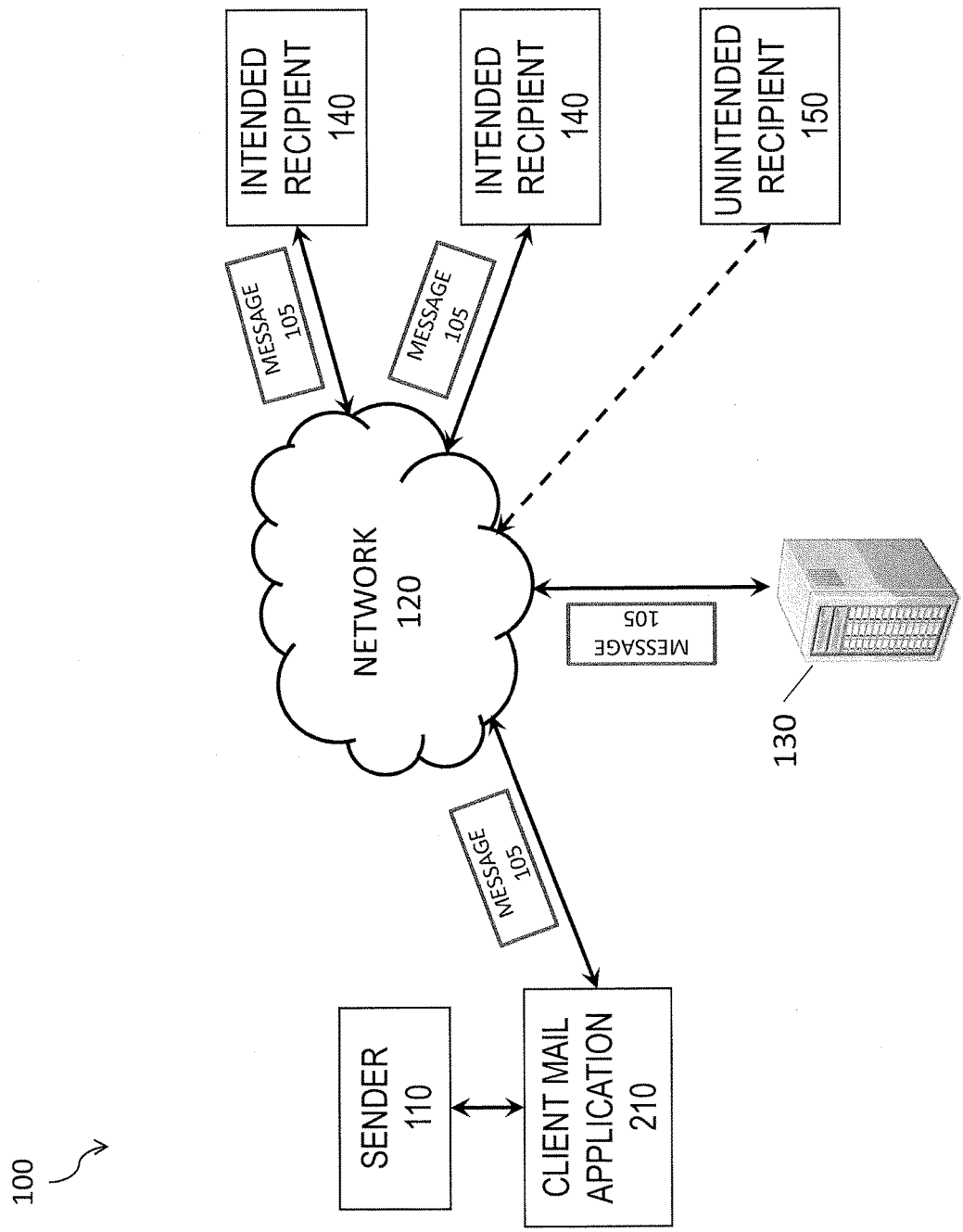
FIG. 2 is a system diagram illustrating a second e-mail attachment routing arrangement.
Figure 3:
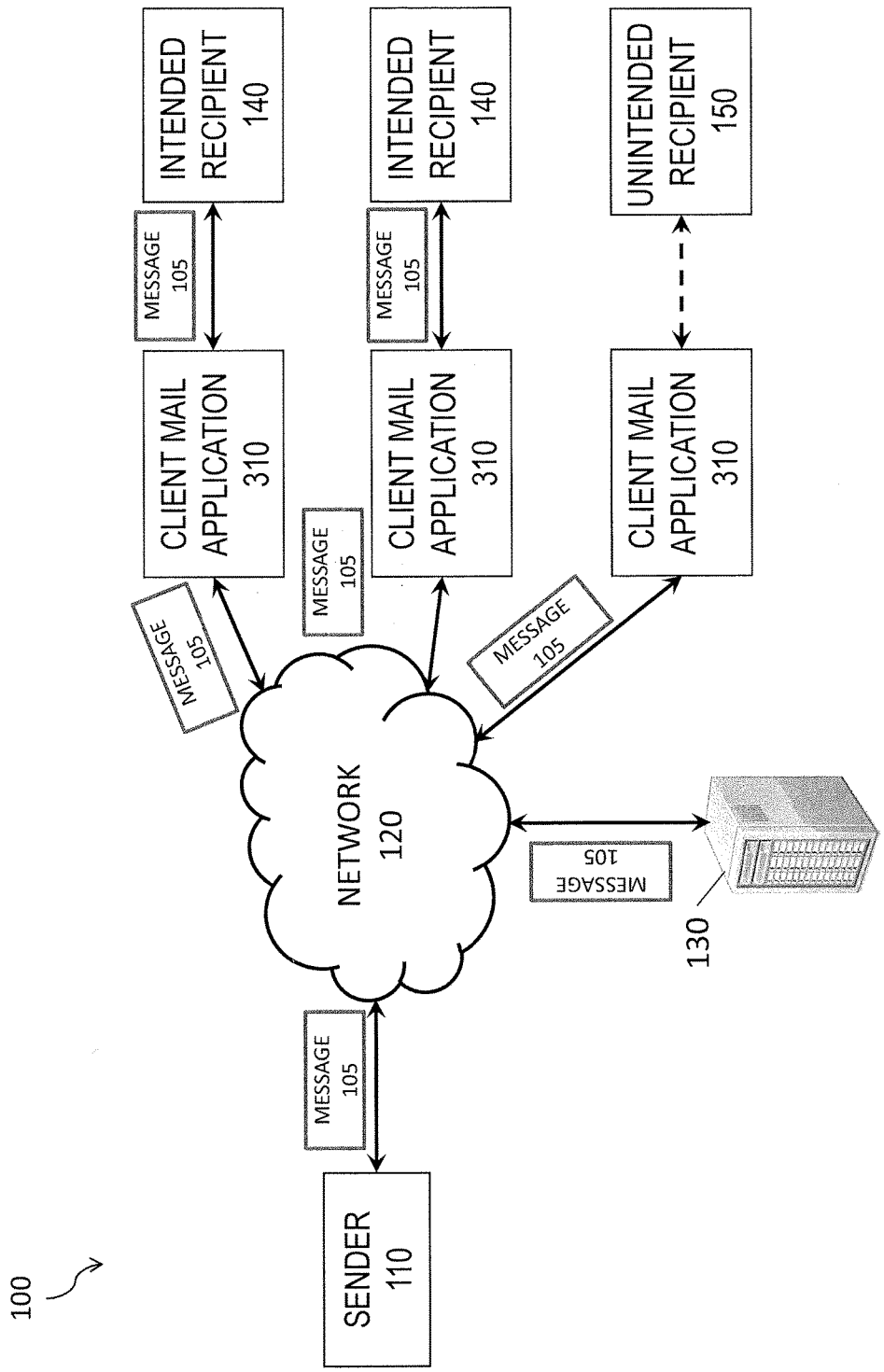
FIG. 3 is a system diagram illustrating a fourth e-mail attachment routing arrangement.

FIGS. 1-3 are diagrams 100-300 that illustrates various arrangements in which a sender 110 can send an e-mail message having an attachment (referred to herein as a message 105) to one or more intended recipients 140 while, at the same time, preventing the inadvertent delivery of such e-mail with the attachment to an unintended recipient 150. The attachment can comprise any file type including, as an example, word processing documents, presentation documents, spreadsheet files, media files, and the like.

The attachment on the message 105 can include a header portion that identifies intended recipients 140 so that, at some point prior to delivery of the message 105, it is confirmed that the intended recipients 140 are specified in such header (so that the message 105 can be sent to such intended recipients 140). These listed intended recipients within the header can sometimes be referred to as the "mail to scope". The header portion of the attachment can be generated in different manners, including when the corresponding file is initially created or later modified (edited, encrypted, compressed, etc.). For example, in a word processor, a user can specify intended recipients/users that are able to access and view such word processing file. Further, the file creator (and other authorized users) can subsequently modify the listed intended recipients as may be required.

Below is a sample file header structure in XML.

```
<need mail to scope check flag >
  <mail to scope>
    <mail> aa@bb.com</mail>
    <mail>cc@dd.com</mail>
  </mail to scope>
</need mail to scope check flag >
```

The header portion of the attachment can be analyzed at various points as part of the delivery/routing of the message. With reference to FIG. 1, the sender 110 can send the message 105 with the attachment via the network 120 to a mail server 130. The mail server 130 can then parse the e-mail to check that the recipients listed in the message 105 match those recipients listed in the header of the attachment. If the header portion of the attachment matches, then the message 105 is then sent, via the network 120, to the intended recipients 140. For the avoidance of doubt, the message is not sent to the unintended recipient 150. In some cases, if the message specifies the unintended recipient 150, the message 105 is bounced back to the sender 110 (i.e., an error message is sent and the message 105 is not delivered to anyone). In other cases, if the message 105 specifies both the intended recipients 140 and the unintended recipient 150, the message 105 will only be sent to the intended recipients 140. With this latter variation, in some cases an error message will be sent back to the sender 110.

FIG. 2 shows an alternative arrangement in which the message 105 having an attachment is generated using a client mail application 220. With this arrangement, the parsing of the attachment of the message 105 is performed at the client device used by the sender 110 (as opposed to the mail server 130). The client mail application 210 ensures that the message 105 is only related to the intended recipients 140 (and not the unintended recipient 150).

FIG. 3 shows yet another alternative arrangement in which the message 105 having an attachment is sent by the sender 110 via the network 120 and the mail server 130 to each of the intended recipients 140 as well as the unintended recipient 150. With this arrangement, each recipient 140, 150 has a client mail application 310 that parses the header of the attachment so that the message 105 is sent to the intended recipients 140 (because they are specified in the header) and the message 105 is not sent to the unintended recipient 150.

In some cases, some or all of the attachment on the message 105 can be encrypted and/or compressed. In such cases, the header portion can remain unencrypted/compressed so that it may be parsed, while in other cases, the header portion needs to be decrypted/decompressed.

Figure 4:
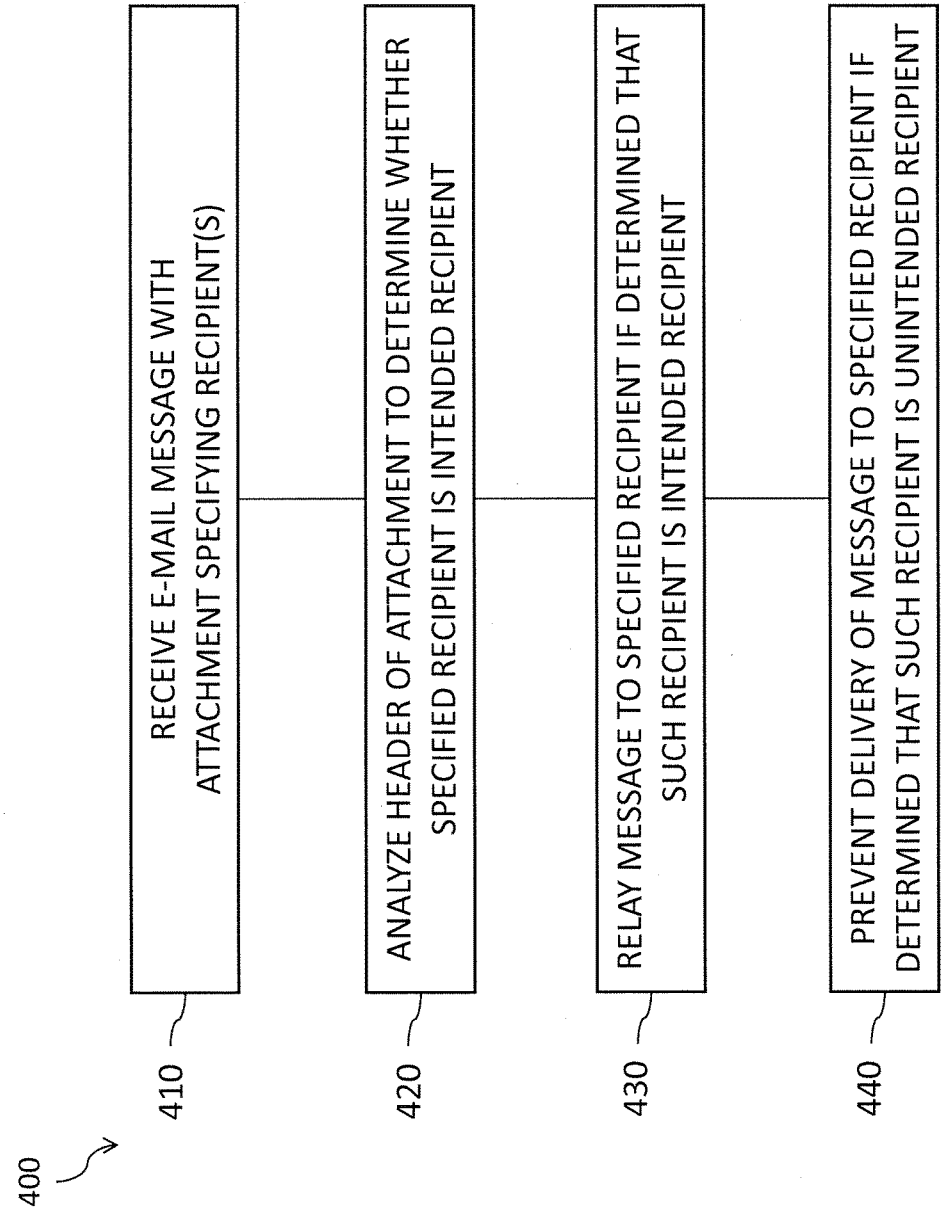
FIG. 4 is a process flow diagram illustrating secure e-mail attachment routing and delivery.

FIG. 4 is a process flow diagram 400 in which, at 410, an e-mail message is received that specifies at least one recipient and comprised an attachment. The attachment is a file having a header specifying at least one e-mail address for a permitted recipient. Thereafter, at 420, the header is analyzed to determine whether the at least one recipient is specified as a permitted recipient. Subsequently, at 430, the e-mail message is related to the at least one recipient if is determined that the at least one recipient is a permitted recipient, and/or at 440, delivery of the e-mail message to the at least one recipient is prevented if is determined that the at least one recipient is not a permitted recipient.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising
receiving, at a mail server, an e-mail message, the e-mail message being received from a first mail application associated with a sender of the e-mail message, the e-mail message specifying a recipient of the e-mail message, the e-mail message further comprising an attachment generated by a file creation and modification application, the generation of the attachment comprising generating a graphic user interface configured to receive a user-generated input specifying at least one of a plurality of permitted recipients for an attachment of an email message, and the generating of the attachment further comprising generating a header and a portion encapsulating content separate from the header, the header comprising the at least one of the plurality of permitted recipients for the attachment, the portion encapsulating the content of the attachment being encrypted, and the header being unencrypted to enable a parsing of the header;
parsing the attachment of the mail to determine whether the header of the attachment includes extensible markup language (XML) instructions for the mail server to verify the recipient of the e-mail message; and
in response to determining that the header of the attachment includes XML instructions for the mail server to verify the recipient of the e-mail message, verify the recipient of the e-mail message by at least:
determining whether the recipient matches at least one of the plurality of permitted recipients specified in the header of the attachment;
relaying the e-mail message to a second mail application associated with the recipient based at least on a determination that the recipient matches at least one of the plurality of permitted recipients specified in the header of the attachment; and
sending, to the first mail application associated with the sender of the e-mail message, an error message based at least on a determination that the recipient does not match at least one of the plurality of permitted recipients specified in the header of the attachment.

2. The method of claim 1, wherein the document creation and modification application is selected from a group consisting of: word processing programs, presentation programs, and spreadsheet programs.

3. The method of claim 1, wherein the portion encapsulating the content of the attachment is further compressed.

4. The method of claim 1, wherein the parsing comprises decrypting or decompressing at least a portion of the e-mail message to enable an analysis of the header of the attachment.

5. The method of claim 1, wherein the e-mail message is prevented from being sent to the second mail application associated with the recipient based at least on the determination that the recipient does not match at least one of the plurality of plurality of permitted recipients specified in the header of the attachment.

6. The method of claim 1, wherein at least one of the receiving, the parsing, the determining, the relaying, and the sending is implemented by at least one hardware data processor forming part of at least one computing system.

7. A non-transitory computer program product storing instructions which, when executed by at least one hardware processor, result in operations comprising:
receiving, at a mail server, an e-mail message, the e-mail message being received from a first mail application associated with a sender of the e-mail message, the e-mail message specifying a recipient of the e-mail message, the e-mail message further comprising an attachment generated by a file creation and modification application, the generation of the attachment comprising generating a graphic user interface configured to receive a user-generated input specifying at least one of a plurality of permitted recipients for an attachment of an email message, and the generating of the attachment further comprising generating a header and a portion encapsulating content separate from the header, the header comprising the at least one of the plurality of permitted recipients for the attachment, the portion encapsulating the content of the attachment being encrypted, and the header being unencrypted to enable a parsing of the header;
parsing the attachment of the mail to determine whether the header of the attachment includes extensible markup language (XML) instructions for the mail server to verify the recipient of the e-mail message; and
in response to determining that the header of the attachment includes XML instructions for the mail server to verify the recipient of the e-mail message, verify the recipient of the e-mail message by at least:
determining whether the recipient matches at least one of the plurality of permitted recipients specified in the header of the attachment;
relaying the e-mail message to a second mail application associated with the recipient based at least on a determination that the recipient matches at least one of the plurality of permitted recipients specified in the header of the attachment; and sending, to the first mail application associated with the sender of the e-mail message, an error message based at least on a determination that the recipient does not match at least one of the plurality of permitted recipients specified in the header of the attachment.

8. The computer program product of claim 7, wherein the document creation and modification application is selected from a group consisting of: word processing programs, presentation programs, and spreadsheet programs.

9. The computer program product of claim 7, wherein the portion encapsulating the content of the attachment is further compressed.

10. The computer program product of claim 7, wherein the parsing comprises decrypting or decompressing at least a portion of the e-mail message to enable an analysis of the header of the attachment.

11. The computer program product of claim 7, wherein the e-mail message is prevented from being sent to the second mail application associated with the recipient based at least on the determination that the recipient does not match at least one of the plurality of permitted recipients specified in the header of the attachment.

12. A system comprising:
at least one hardware data processor; and
at least memory storing instructions which, when executed by the at least one hardware processor, result in operations comprising:
  receiving, at a mail server, an e-mail message, the e-mail message being received from a first mail application associated with a sender of the e-mail message, the e-mail message specifying a recipient of the e-mail message, the e-mail message further comprising an attachment generated by a file creation and modification application, the generation of the attachment comprising generating a graphic user interface configured to receive a user-generated input specifying at least one of a plurality of permitted recipients for an attachment of an email message, and the generating of the attachment further comprising generating a header and a portion encapsulating content separate from the header, the header comprising the at least one of the plurality of permitted recipients for the attachment, the portion encapsulating the content of the attachment being encrypted, and the header being unencrypted to enable a parsing of the header;
parsing the attachment of the mail to determine whether the header of the attachment includes extensible markup language (XML) instructions for the mail server to verify the recipient of the e-mail message; and
in response to determining that the header of the attachment includes XML instructions for the mail server to verify the recipient of the e-mail message, verify the recipient of the e-mail message by at least:
  determining whether the recipient matches at least one of the plurality of permitted recipients specified in the header of the attachment;
  relaying the e-mail message to a second mail application associated with the recipient based at least on a determination that the recipient matches at least one of the plurality of permitted recipients specified in the header of the attachment; and
  sending, to the first mail application associated with the sender of the e-mail message, an error message based at least on a determination that the recipient does not match at least one of the plurality of permitted recipients specified in the header of the attachment.

* * * * *